US012782130B2

(12) United States Patent
Gattere et al.

(10) Patent No.: US 12,782,130 B2
(45) Date of Patent: Nov. 3, 2026

(54) VIBRATIONAL MEMS STRUCTURE, IN PARTICULAR GYROSCOPE, HAVING SPURIOUS MODE TEST STRUCTURES, TEST SYSTEM AND METHOD

(71) Applicant: STMicroelectronics International N.V., Geneva (CH)

(72) Inventors: Gabriele Gattere, Castronno (IT); Luca Guerinoni, Alzano Lombardo (IT)

(73) Assignee: STMicroelectronics International N.V., Geneva (CH)

(*) Notice: Subject to any disclaimer, the term of this patent is extended or adjusted under 35 U.S.C. 154(b) by 266 days.

(21) Appl. No.: 18/654,869

(22) Filed: May 3, 2024

(65) Prior Publication Data

US 2024/0377198 A1 Nov. 14, 2024

(30) Foreign Application Priority Data

May 12, 2023 (IT) ........................ 102023000009597

(51) Int. Cl.
*G01C 19/5762* (2012.01)
*G01C 19/5726* (2012.01)

(52) U.S. Cl.
CPC ..... *G01C 19/5762* (2013.01); *G01C 19/5726* (2013.01)

(58) Field of Classification Search
None
See application file for complete search history.

(56) References Cited

U.S. PATENT DOCUMENTS

| | | | | |
|---|---|---|---|---|
| 5,780,948 A | 7/1998 | Lee et al. | | |
| 6,915,693 B2 * | 7/2005 | Kim | G01C 19/5762 | 73/504.12 |
| 7,204,144 B2 * | 4/2007 | Geen | G01C 19/5719 | 73/504.12 |
| 7,513,155 B2 * | 4/2009 | Jeong | G01C 19/5747 | 73/504.04 |
| 8,272,266 B2 * | 9/2012 | Zhang | G01C 19/5719 | 310/309 |
| 8,978,472 B2 * | 3/2015 | Takizawa | G01C 19/5747 | 73/504.12 |

(Continued)

FOREIGN PATENT DOCUMENTS

JP 2007139505 A 6/2007

OTHER PUBLICATIONS

Facchinetti, et al., "Development of a complete model to evaluate the Zero Rate Level drift over temperature in MEMS Coriolis Vibrating Gyroscopes," 2017 IEEE International Symposium on Inertial Sensors and Systems (INERTIAL), pp. 125-128 STMicroelectronics, Comaredo (MI), Italy.

(Continued)

*Primary Examiner* — Peter J Macchiarolo
*Assistant Examiner* — Jermaine L Jenkins
(74) *Attorney, Agent, or Firm* — Seed IP Law Group LLP

(57) ABSTRACT

Test method of a vibrational MEMS structure wherein, a direct, variable modification voltage is applied to a resonance modification test structure having non-rectilinear electrodes, modifying the resonance frequency of the movable mass and the driving frequency. During the test, the movable mass is verified about stability and, if not stable, the vibrational MEMS structure is rejected.

20 Claims, 6 Drawing Sheets

(56) References Cited

U.S. PATENT DOCUMENTS

| | | | | |
|---|---|---|---|---|
| 9,103,673 | B2 * | 8/2015 | Swanson | G01C 19/56 |
| 10,444,013 | B2 * | 10/2019 | Prati | G01C 19/5712 |
| 2016/0101975 | A1 | 4/2016 | Ono et al. | |

OTHER PUBLICATIONS

Jensen et al., "Shaped comb fingers for tailored electromechanical restoring force," in Journal of Microelectromechanical Systems, vol. 12, No. 3, pp. 373-383, Jun. 2003.

* cited by examiner

FIG. 14
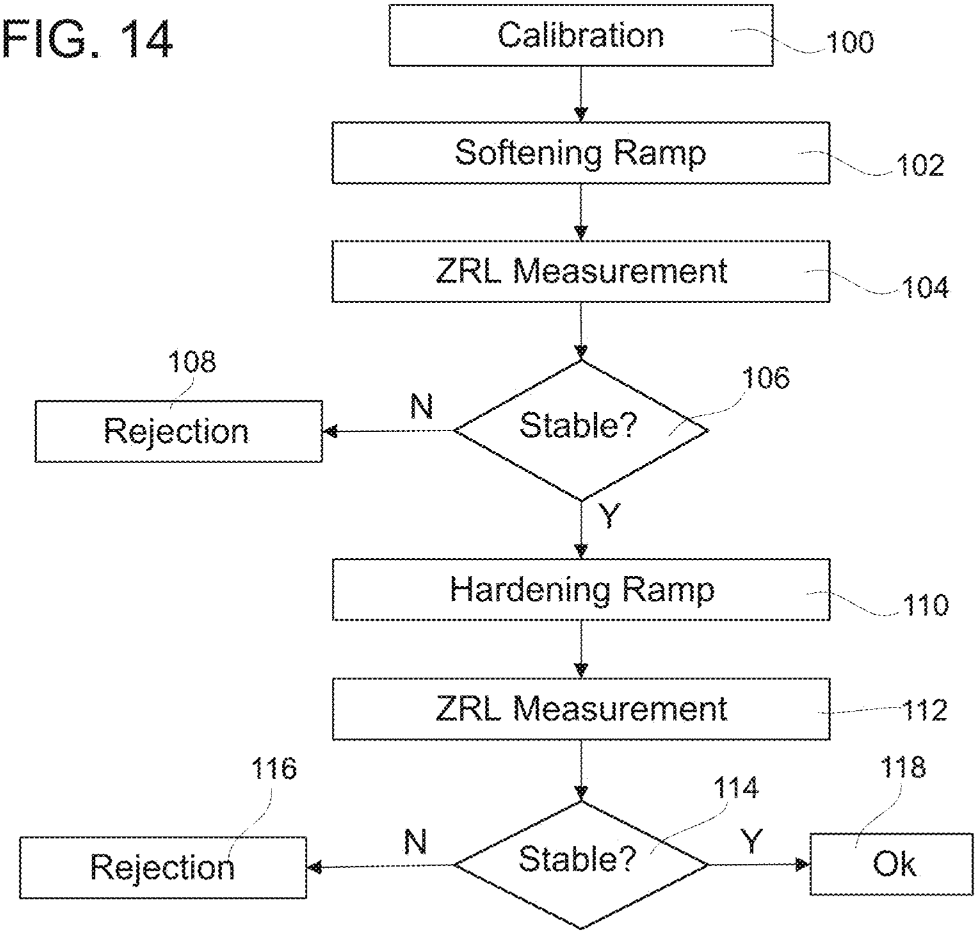
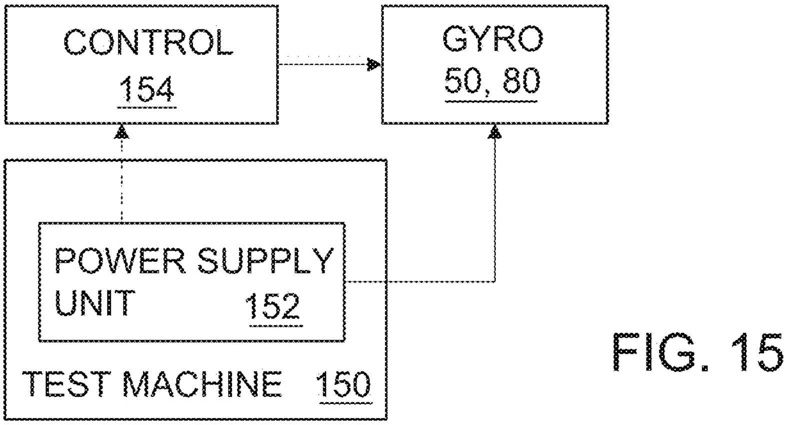
FIG. 15

VIBRATIONAL MEMS STRUCTURE, IN PARTICULAR GYROSCOPE, HAVING SPURIOUS MODE TEST STRUCTURES, TEST SYSTEM AND METHOD

BACKGROUND

Technical Field

The present disclosure relates to a vibrational MEMS structure, in particular MEMS gyroscope, having spurious mode test structures, to a test system and method.

Description of the Related Art

As is known, gyroscopes exploit the Coriolis effect on the basis of which, when a movable mass which oscillates with a linear speed along a first direction rotates around a rotation axis, perpendicular to the direction of the linear speed, it is subject to a force (called Coriolis force) that is directed along a second direction, perpendicular to the rotation axis and to the first direction.

Furthermore, gyroscopes are known that are manufactured using the MEMS ("Micro Electro-Mechanical System") technology in a die of semiconductor material, for example silicon, wherein one or more movable masses are suspended on a substrate and are free to oscillate with respect to the substrate with one or more degrees of freedom.

In particular, MEMS gyroscopes may be of uniaxial, biaxial or triaxial type, configured to sense movements of the movable mass or movable masses in an extension plane thereof and/or movements directed perpendicularly to the extension plane.

For example, a triaxial MEMS gyroscope may sense movements of more movable masses, caused by rotations of the gyroscope about an axis perpendicular to the extension plane of the movable masses (yaw movements), and movements directed perpendicularly to the extension plane of the movable masses, caused by rotations of the gyroscope about two axes, perpendicular to each other, lying in the extension plane (roll movement and pitch movement).

To this end, the movable masses are elastically supported on a substrate, so as to be able to move with respect thereto, and are coupled to the substrate through driving structures, configured to cause an oscillation of the movable masses along respective driving directions, and through sensing structures, configured to sense a displacement of the movable masses along respective sensing directions.

Both the driving coupling and the sensing coupling may be based on different physical principles; hereinafter, reference will be made to gyroscopes having capacitively operating sensing and driving structures, although the disclosure is not limited to capacitive sensing.

For example, FIG. 1 shows a simplified diagram of a triaxial MEMS gyroscope, wherein the gyroscope, indicated by 1, has driving structures operating along a single first driving direction.

In detail, the gyroscope 1 has four movable masses, i.e., a first movable mass 2, a second movable mass 3, a third movable mass 4 and a fourth movable mass 5.

The movable masses 2-5, in rest condition, extend in a lying plane parallel to a horizontal plane XY, defined by a first horizontal axis X and by a second horizontal axis Y of a Cartesian reference system XYZ.

The gyroscope 1 has a driving system comprising a first driving electrode group, indicated by 11A, coupled between the first movable mass 2 and a substrate 10 (indicated schematically) and a second driving electrode group, indicated by 11B, coupled between the second movable mass 3 and the substrate 10.

In a known manner, each driving electrode group 11A, 11B has movable electrodes, integral with the first movable mass 2, respectively with the second movable mass 3, and fixed electrodes, integral with the substrate, facing and capacitively coupled to the respective movable electrodes. The driving movement occurs by applying a potential difference between the fixed electrodes and the movable electrodes, through an alternating (typically rectangular) driving signal.

The first and the second movable masses 2, 3 are supported on the substrate 10 so as to be able to oscillate along a first driving direction D1, parallel to the second horizontal axis Y (first driving movement) and to be able to oscillate parallel (or with a movement component that is parallel) to a vertical axis Z of the Cartesian reference system XYZ, in presence of a pitch movement P (rotation of the gyroscope 2 about the first horizontal axis X).

First sensing electrodes 12A, 12B (shown dashed as not visible) are arranged on the substrate 10, below the first and the second movable masses 2, 3, and are coupled to the first movable mass 2 and, respectively, to the second movable mass 3, for sensing the pitch movement P along the vertical axis Z.

The third and the fourth movable masses 4, 5 are supported on the substrate 10 so as to be able to oscillate along a second driving direction D2, parallel to the first horizontal axis X, (second driving movement) and to be able to oscillate parallel (or with a movement component parallel) to the vertical axis Z, in presence of a roll movement R (rotation of the gyroscope about the second horizontal axis Y).

Systems of elastic springs 13, shown in a schematic manner, allow transferring the first driving movement (directed along the first driving direction D1 and generated by the driving electrode groups 11A, 11B) from the first and the second movable masses 2, 3 to the third and the fourth movable masses 4, 5, turning it into the second driving movement, along the second driving direction D2 (see for example patent application EP 4 124 827A1).

Second sensing electrodes 15A, 15B (shown dashed as not visible) are arranged on the substrate 10, below the third and, respectively, the fourth movable masses 4, 5, and are coupled thereto, for sensing the roll movement R along the vertical axis Z.

The third and the fourth movable masses 4, 5 are also supported on the substrate 10 so as to be able to oscillate along a third sensing direction, parallel to the first horizontal axis X, in presence of a yaw movement Yaw (rotation of the gyroscope about the vertical axis Z). The third and the fourth movable masses 4, 5 are then coupled to the substrate 10 through third sensing electrodes 16A, 16B, for sensing the yaw movement Yaw.

In a known manner, the first, second and third sensing electrode groups 12A, 12B, 15A, 15B and 16A, 16B sense capacitive changes caused by the movement of the respective movable masses 2-5 (sensing signals).

Furthermore, FIG. 1 schematically shows systems of springs 17 shaped so as to ideally allow all and only the movements of the movable masses 2-5 indicated above.

In practice, each movable mass of the MEMS gyroscopes of the indicated type, as to each sensing direction, may be thought of as a mechanical system capable of vibrating according to two different vibrational modes, and precisely a driving mode, caused by the application of the driving signal at a driving frequency, generally chosen close to the resonance frequency of the movable mass, and a sensing mode, at a frequency normally different from, but close to, the driving frequency, so as to have a suitable mechanical response in response to the driving signal.

See for example FIG. 2, showing the amplitude of the transfer function of a movable mass of a MEMS gyroscope, having in the ordinates the displacement of the oscillating mass (represented by the normalized variable X/F-displacement/force) and in the abscissas the frequency f, as to the driving movement (curve A) and the sensing movement (curve B). This Figure clearly shows the frequency difference M (also called "mismatch sense-drive") between the resonant driving frequency fa (center of curve A) and the respective sensing frequency fs (center of curve B).

Since, as said, commercial gyroscopes are actuated using a non-sinusoidal, but square-wave, driving signal, a non-linear driving condition exists. This lack of linearity adds to that caused by the non-ideal behavior of the force-displacement transfer function (behavior as a non-linear Duffing oscillator) and causes, in addition to the forcing at the driving frequency $f_d$, secondary forcings at higher harmonics to be generated. For example, FIG. 3 shows a higher-frequency forcing (curve C) centered on the third harmonic $3f_d$.

Furthermore, in addition to the two ideal vibrational modes, MEMS gyroscopes also have numerous unwanted vibrational modes (generally referred to as "spurious" modes) which alter their theoretical transfer function and may cause unwanted behaviors of the gyroscope. These spurious modes are mainly due to geometric inaccuracies due to spreads of the manufacturing process. Such spurious modes may be many (system with infinite degrees of freedom), as shown for example in FIG. 4, representing the distribution of spurious modes in a real MEMS gyroscope. Here, the ordinates indicate a progressive number relating to the spurious modes; for each of them the width in the frequency domain of each mode is represented; the driving frequency fa is also represented. Due to the large number of spurious modes, some of them may occur at higher harmonics of the driving. If this occurs, especially in case of the third harmonic (the most "energetic" one of the higher harmonics), it may excite the spurious mode at the same frequency, causing a degradation in the gyroscope performances.

The design of the gyroscopes is therefore studied so as to avoid that the higher harmonics of the driving signal fall at spurious vibrational modes.

However, this is not always sufficient. In fact, during the final manufacturing steps and the life of the gyroscope, events may occur which modify the position of the spurious modes, shifting them in the frequency domain and causing a superimposition between them and the harmonics of the driving signal.

For example, external effects, such as temperature and humidity changes, as well as stresses caused by the final manufacturing steps, such as, for example, soldering the die integrating the gyroscope to a support, packaging and the like, may cause die stress and deformation. Such deformations and stresses may modify the geometric parameters of the MEMS gyroscope, including the yielding of the springs, resulting in a modification of the position of the spurious modes. This is represented for example in FIG. 5, showing a spurious mode (curve D) which shifts in the frequency domain and therefore may move forward the third harmonic (curve C).

Such shifts, as said, may also occur over time and are therefore difficult to avoid or predict and may cause a degradation in the performances of the gyroscope, sometimes becoming evident only after the gyroscope has been mounted in an electronic apparatus by the manufacturer of the same electronic apparatus and causing early failures.

To reduce this problem, commercial gyroscopes undergo laboratory characterization (an operation usually performed on samples) and dedicated verification/configuration steps at a final test level.

For example, a typical reliability test uses the MEMS gyroscope driving characteristics (amplitude-frequency curve) and forces the gyroscope to work at a different driving amplitude, shifting the driving frequency. This frequency shift generally does not affect most spurious modes and allows operating the device at more reliable frequencies.

However, even this procedure does not completely solve the problem.

In fact, the usable frequency change is normally small; moreover, due to the characteristics of the gyroscope (sign of the Duffing coefficient in the equation describing the oscillations of an oscillating mass), this solution allows the driving frequency to be shifted only in one direction (upwards or downwards), sometimes making the situation worse.

In any case, this test and related characterization require long time and increase the costs of the final device.

BRIEF SUMMARY

The present disclosure is directed to overcoming the drawbacks as discussed earlier herein.

According to the present disclosure, there are provided one or more embodiments of a vibrational MEMS structure, a test system and a test method.

For example, at least one embodiment of the vibrational MEMS structure may be summarized as including may be summarized as including: a substrate; a movable mass suspended on the substrate and having a resonance frequency; a resonance modification test structure, comprising modification fixed electrodes, integral with the substrate, and modification movable electrodes, integral with the movable mass, each modification fixed electrode extending in a length direction and facing at least one respective modification movable electrode, the modification fixed electrodes and the modification movable electrodes being configured so that each modification fixed electrode is placed, at rest, at a distance, from the respective at least one modification movable electrode, which is variable along the length direction and defines an average gap, wherein the resonance modification test structure is configured to be biased, in a resonance modification test step, to a direct and variable modification voltage such as to cause a modification of the average gap between each modification fixed electrode and a respective modification movable electrode, by modifying the resonance frequency of the movable mass and the driving frequency.

BRIEF DESCRIPTION OF THE SEVERAL VIEWS OF THE DRAWINGS

For a better understanding of the present disclosure, embodiments thereof are now described, purely by way of non-limiting example, with reference to the attached drawings, wherein:

FIG. 14 is a flowchart of a test method using the test structure of FIGS. 6-8; and FIG. 15 shows a test system for a MEMS gyroscope.

DETAILED DESCRIPTION

The following description refers to the arrangement shown; consequently, expressions such as "above", "below", "top", "bottom", "right", "left" relate to the accompanying Figures and are not to be interpreted in a limiting manner.

The following description refers in particular to a MEMS gyroscope, but the discussion also applies to other types of vibrational MEMS structures, such as accelerometers.

Figure 6:
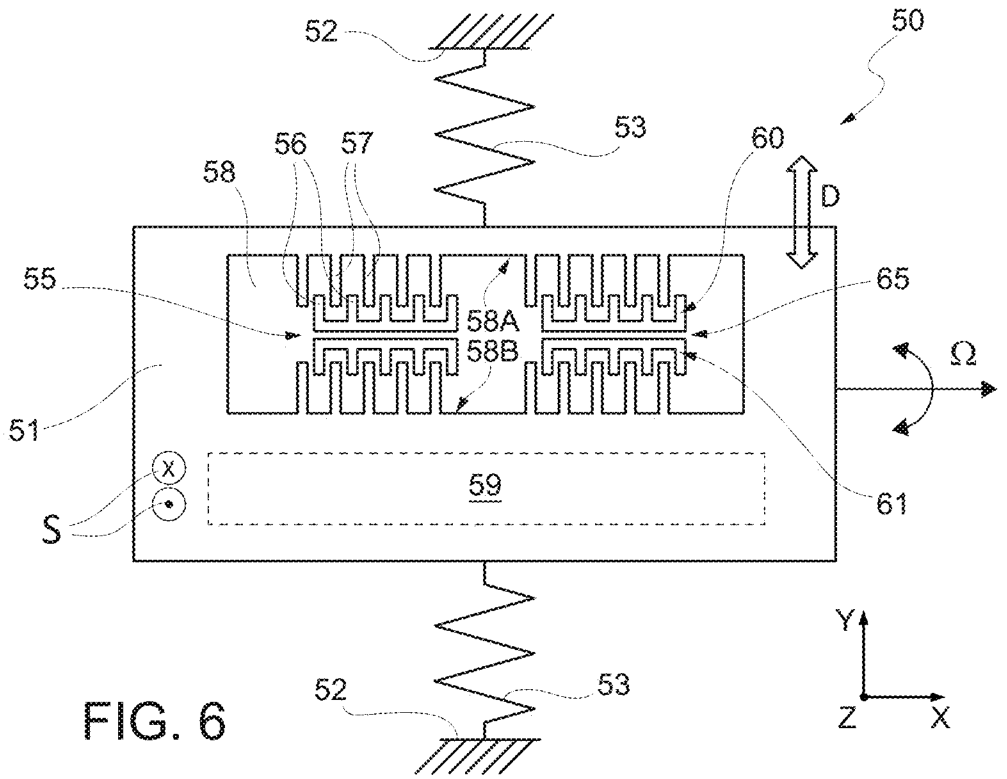
FIG. 6 is a schematic top view of a movable mass of a vibrational MEMS gyroscope, having a test structure according to an embodiment.

FIG. 6 shows a gyroscope 50, of vibrational MEMS type, with capacitive actuation and sensing. The gyroscope 50 is shown as to its essential structure, by way of example, for sensing rotational fields about a single axis.

The gyroscope 50 has a single movable mass (movable mass 51) lying, in rest condition, in a lying plane parallel to a horizontal plane XY defined by a first horizontal axis X and by a second horizontal axis Y of a Cartesian reference system XYZ.

The movable mass 51 is supported on a substrate 52 (represented schematically) by a system of springs 53 (also represented schematically) which, when the gyroscope 50 is immersed in a rotational field (2 directed parallel to the first horizontal axis X, allow a driving movement D of the movable mass 51 in a driving direction (in the embodiment of FIG. 6, parallel to the second horizontal axis Y), and a sensing movement S, in a direction perpendicular (or having at least one component directed perpendicularly) to the driving direction (in the embodiment of FIG. 6, directed parallel to a vertical axis Z of the Cartesian reference system XYZ).

The gyroscope 50 has a driving structure 55 comprising driving fixed electrodes 56 and driving movable electrodes 57.

In the embodiment of FIG. 6, the driving structure 55 is arranged inside an opening 58, of through-type and of rectangular shape.

In detail, the driving fixed electrodes 56 are integral with the substrate 52 and are here arranged facing two opposite sides of the opening 58 (for example, the major sides of the rectangular shape of the opening 58).

The driving movable electrodes 57 here extend from the movable mass 51 towards the inside of the opening 58; they are therefore integral with the movable mass 51. The driving movable electrodes 57 face and are capacitively coupled to the driving fixed electrodes 56, forming a comb-like structure.

The gyroscope 50 also has a sensing structure including a sensing electrode 59. In the exemplary structure of FIG. 6, the sensing electrode 59 (shown dashed as not visible) is arranged on the substrate 52, below and capacitively coupled to the movable mass 51.

In use, a potential difference is applied between the driving fixed electrodes 56 and the driving movable electrodes 57 through a rectangular driving signal (square wave) at a driving frequency; and a known control loop system (generally external to the gyroscope 50) causes this frequency to remain close to the resonance frequency of the movable mass 51.

The gyroscope 50 also has a resonance frequency modification structure 65 including a softening structure 60 and a hardening structure 61, also formed within the opening 58 of the movable mass 51.

In particular, here, the softening 60 and hardening structures 61 are arranged side by side with the driving system 55, with the softening structure 60 arranged in proximity of a first major side or sidewall 58A of the opening 58 and the hardening structure 61 arranged in proximity of a second major side or sidewall 58B, opposite to the first major side 58A, of the opening 58.

Both the softening structure 60 and the hardening structure 61 are "almost comb-like" structures, being provided with interdigitated electrodes with a non-rectangular shape.

Figure 7:
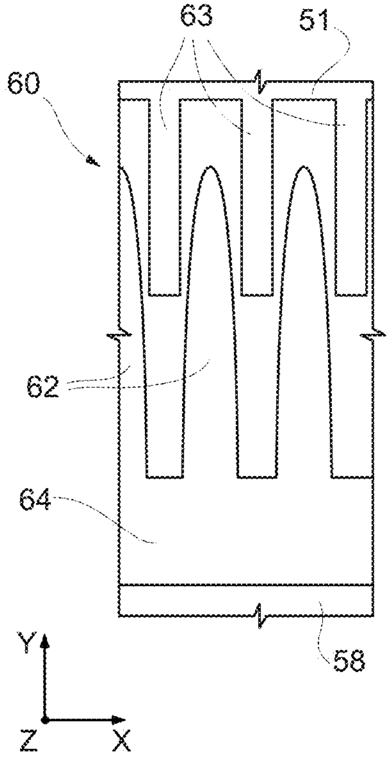
FIG. 7 shows an enlarged detail of the gyroscope of FIG. 6, relating to a part of the test structure.

In detail, and with reference also to FIG. 7, the softening structure 60 has softening fixed electrodes 62, integral with the substrate 10 through a first fixed region 64, and softening movable electrodes 63, integral with the movable mass 51, facing and capacitively coupled to the softening fixed electrodes 62.

The softening movable electrodes 63 extend here from the first major side of the opening 58.

In the embodiment shown, and with particular reference to FIG. 7, the softening fixed electrodes 62 are not rectangular, but have a width which is maximum at the first fixed region 64 and decreases towards the respective ends facing the softening movable electrodes 63.

In particular, here, the softening fixed electrodes 62 have a curved, almost parabolic shape.

In general, the softening fixed electrodes 62 may have a shape described by the quadratic equation:

$$y = \alpha 0 + \alpha 1x + \alpha 2x^2$$

where x and y define the points along directions parallel to the horizontal axes X and Y and the coefficients α0, α1 and α2 are set during design, based on simulations, chosen so as to have a better trade-off between the dimensions of the gyroscope 50 and sufficient change in the resonance frequency.

Conversely, the softening movable electrodes 63 have a standard, rectangular shape.

Consequently, the points of each softening fixed electrode 62, that face the two adjacent softening movable electrodes 63, are at a distance, from the adjacent softening movable electrodes 63, that varies along the length direction of the softening fixed electrodes 62.

In other words, the gap between each softening fixed electrode 62 and the softening movable electrodes 63 facing it is not fixed, but varies along the length direction of the softening fixed electrodes 62 (here, parallel to the second horizontal axis Y).

Figure 9A:
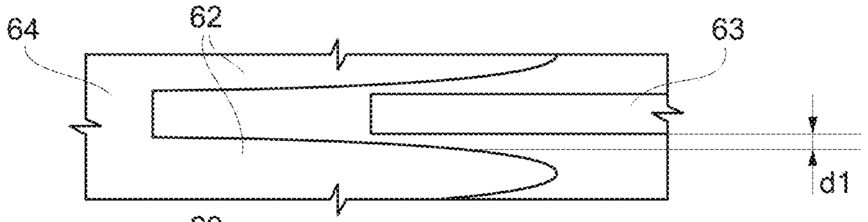
FIGS. 9A-9C show different relative positions of the test structure of FIG. 7.
Figure 9B:
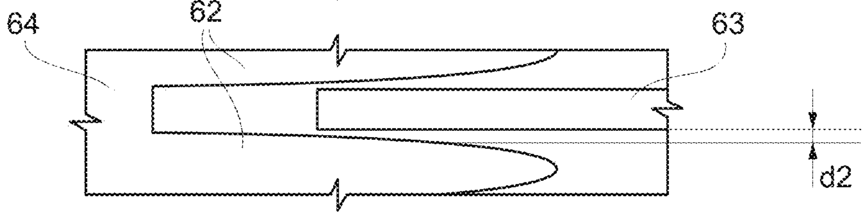
Figure 9C:
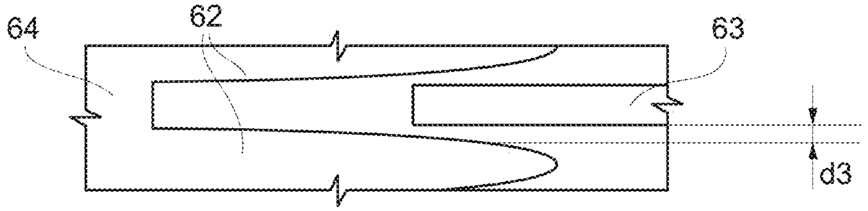

As a result, as shown in FIGS. 9A-9C, during the movement of the movable mass 51, according to the mutual position of the softening fixed electrodes 62 and the softening movable electrodes 63, the average gap between the facing surfaces between these electrodes 62, 63 changes.

In fact, in the rest position shown in FIG. 9A, each softening movable electrode 63 is placed at an average rest gap, from an adjacent softening fixed electrode 62, facing it, equal to d1 (softening average rest gap d1).

In the case of maximum movement of the softening movable electrodes 63 towards the first fixed region 64 (FIG. 9B), the average gap between each softening movable electrode 63 and an adjacent softening fixed electrode 62, facing it, is equal to a softening minimum average gap d2, lower than the softening average rest gap d1 (d2<d1).

Conversely, in the case of maximum movement of the softening movable electrodes 63 away from the first fixed region 64 (FIG. 9C), the average gap between each softening movable electrode 63 and the adjacent softening fixed electrode 62, facing it, is equal to a softening maximum gap d3, greater than the softening average rest gap d1 (d3>d1).

As known to the person skilled in the art, the change in the average gap between capacitively coupled electrodes (here, the softening movable electrodes 63 and the softening fixed electrodes 62) determines a non-linear capacitance change, namely a capacitance reduction as the average gap increases.

Figures 11A, 11B, 12A, 12B:
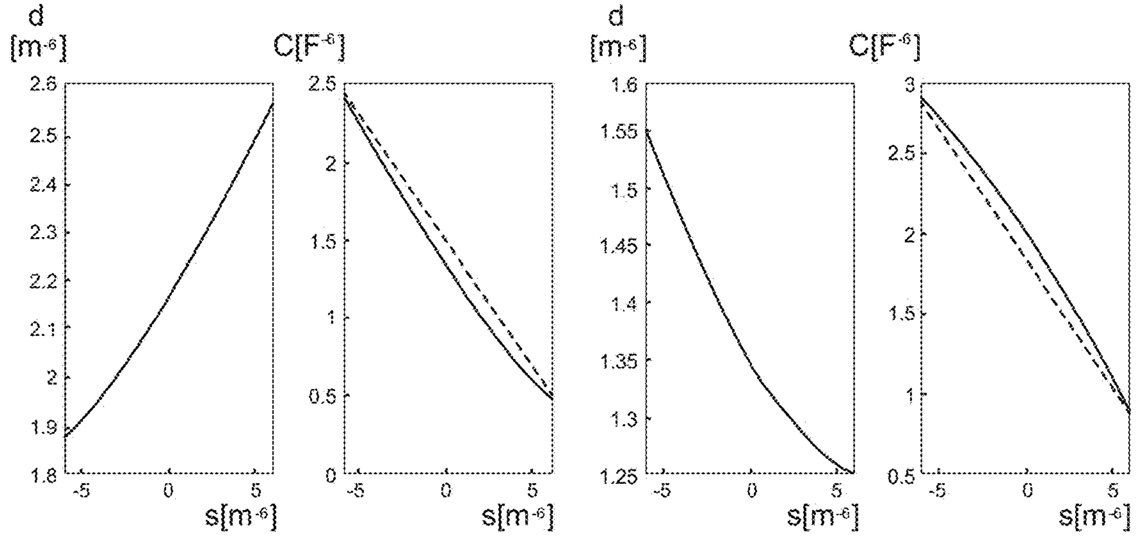
FIGS. 11A and 11B show plots of quantities related to the movable mass of FIG. 6 due to the structure of the test structure of FIG. 7.
FIGS. 12A and 12B show plots of simulated quantities related to the movable mass of FIG. 6 due to the test structure of FIG. 8.

The relationship between displacement of the softening movable electrodes 63, average gap between adjacent electrodes 62, 63 and capacitance is visible in the simulations shown in FIGS. 11A and 11B, respectively representing the plot of the average gap d as a function of the displacement s of the softening movable electrodes 63 (on the abscissa) and the corresponding change of the capacitance C (shown with a solid line).

FIG. 11B also shows, with dashed line and for comparison, the capacitance change, here linear, caused by the reduction of the facing area between the softening movable electrodes 63 and the softening fixed electrodes 62, as the displacement s increases in the case of a standard comb-like structure, with rectangular shaped electrodes (both fixed and movable).

Since, in a known manner, the non-linear change of capacitance C determines an elasticity change of the system of springs 53 of the gyroscope 50 and precisely an electrostatic softening effect, the capacitance reduction entails a reduction in the resonance frequency of the gyroscope 50.

Since the gyroscope 50 has a resonance frequency tracking system, as indicated above, by operating the softening structure 60, it is possible to reduce the driving frequency of the gyroscope 50, thereby also modifying the positioning of its harmonics.

Figure 8:
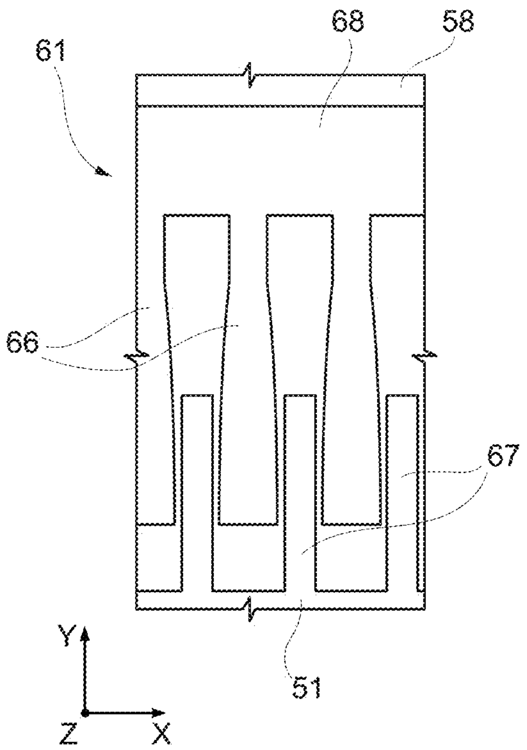
FIG. 8 shows an enlarged detail of the gyroscope of FIG. 6 relating to another part of the test structure.

With reference to FIGS. 6 and 8, the hardening structure 61 has hardening fixed electrodes 66, integral with the substrate 10 through a second fixed region 68, and hardening movable electrodes 67, integral with the movable mass 51, facing and capacitively coupled to the hardening fixed electrodes 66.

The hardening movable electrodes 66 here extend on an opposite side of the opening 58 with respect to the softening movable electrodes 63 (from the second major side 58B).

In the embodiment shown, and with particular reference to FIG. 8, the hardening fixed electrodes 66 are not rectangular, but have a width which is maximum at the respective ends facing the hardening movable electrodes 67 and reduces, in the length direction, towards the second fixed region 68, where they have minimum width.

In particular, here, the hardening fixed electrodes 66 have a curved, almost parabolic shape.

Also here, the shape of the hardening fixed electrodes 66 may be described by a quadratic equation, as described above for the softening fixed electrodes 62.

Conversely, the hardening movable electrodes 67 have a standard, rectangular shape.

Consequently, the gap between each hardening fixed electrode 66 and the hardening movable electrodes 67, facing it, is not fixed, but varies along the length direction of the hardening fixed electrodes 67 (here parallel to the second horizontal axis Y).

Figure 10A:
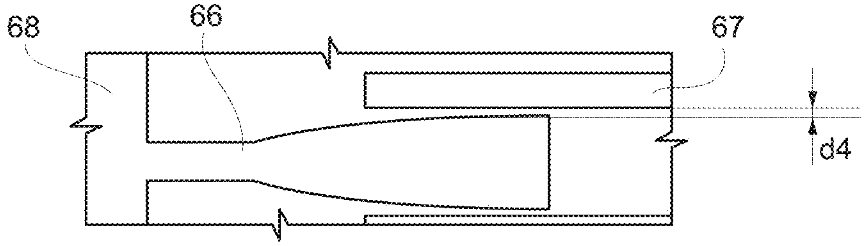
FIGS. 10A-10C show different relative positions of the test structure of FIG. 8.
Figure 10B:
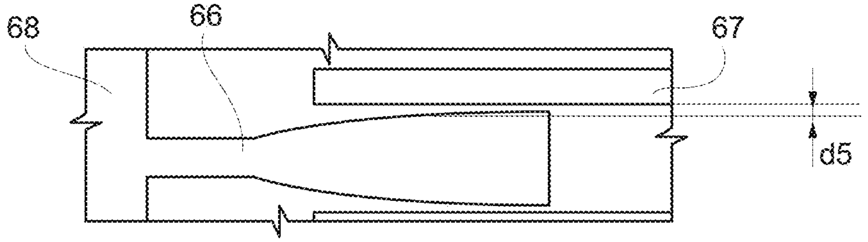
Figure 10C:
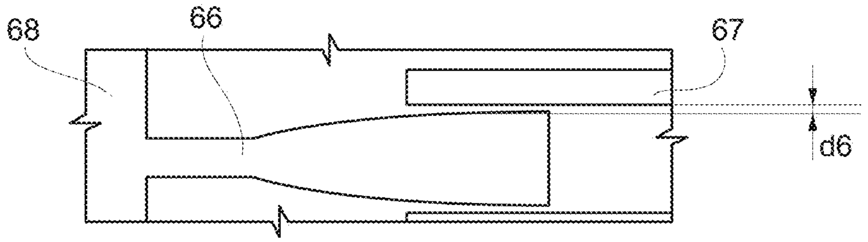

Also here, as shown in FIGS. 10A-10C, according to the mutual position of the hardening fixed electrodes 66 and the softening movable electrodes 67, the average gap between the facing surfaces of these electrodes 66, 67 changes.

In fact, in the rest position shown in FIG. 10A, each hardening movable electrode 67 is placed at an average rest gap, from an adjacent hardening fixed electrode 66, facing it, equal to d4.

In case of maximum movement of the hardening movable electrodes 67 towards the second fixed region 68 (FIG. 10B), the average gap between each hardening movable electrode 67 and an adjacent hardening fixed electrode 66, facing it, is equal to a hardening maximum average gap d5, greater than the softening average rest gap d4 (d5>d4).

Conversely, in case of maximum movement of the hardening movable electrodes 67 away from the second fixed region 68 (FIG. 10C), the average gap between each hardening movable electrode 67 and the adjacent hardening fixed electrode 66, facing it, is equal to a hardening maximum gap d6, lower than the softening average rest gap d4 (d6<d4).

Also in this case, the change in the average gap between the hardening movable electrodes 67 and the hardening fixed electrodes 66 determines a non-linear capacitance change.

The relationship between displacement of the hardening movable electrodes 67, average gap between adjacent electrodes 66, 67 and capacitance is visible in the simulations shown in FIGS. 12A and 12B, respectively representing the plot of the average gap d as a function of the displacement s of the hardening movable electrodes 67 (on the abscissa) and the corresponding simulated change in the capacitance C (shown with a solid line). Also here, with dashed line and for comparison, the linear capacitance change is shown, caused by the reduction of the facing area between the hardening movable electrodes 67 and the hardening fixed electrodes 66, as the displacement s increases in case of a standard comb-like structure, with rectangular shaped electrodes (both fixed and movable).

Also here, the non-linear change in the capacitance C determines an elasticity change of the system of springs 53 of the gyroscope 50, change that, in case of the hardening structure 61, in particular, entails a hardening of the springs 53 and therefore an increase in the resonance frequency of the gyroscope 50.

In other words, due to the automatic correction of the driving frequency as a function of the resonance frequency, the driving frequency of the gyroscope 50 may be increased by activating the hardening structure 61, thereby also modifying the positioning of its harmonics.

Conversely, the spurious modes are generally associated to geometries and inaccuracies of gyroscope structures other than the system of springs 53 which influence the resonance frequency of the gyroscope 50 and therefore they are not, as a first approximation, affected by the different positioning of the harmonics of the driving signal.

This allows highlighting possible marginalities of the gyroscope 50, linked to a condition of dangerous proximity of the harmonics of the driving signal and the closest spurious modes, a condition which might subsequently lead to the excitation of these spurious modes. Conversely, with the gyroscope 50, by causing the frequency of the harmonics of the driving mode to both increase and decrease (and keeping the spurious modes substantially unchanged) and verifying whether the harmonics superimpose with spurious modes, this dangerous condition may be recognized in advance.

Figure 1:
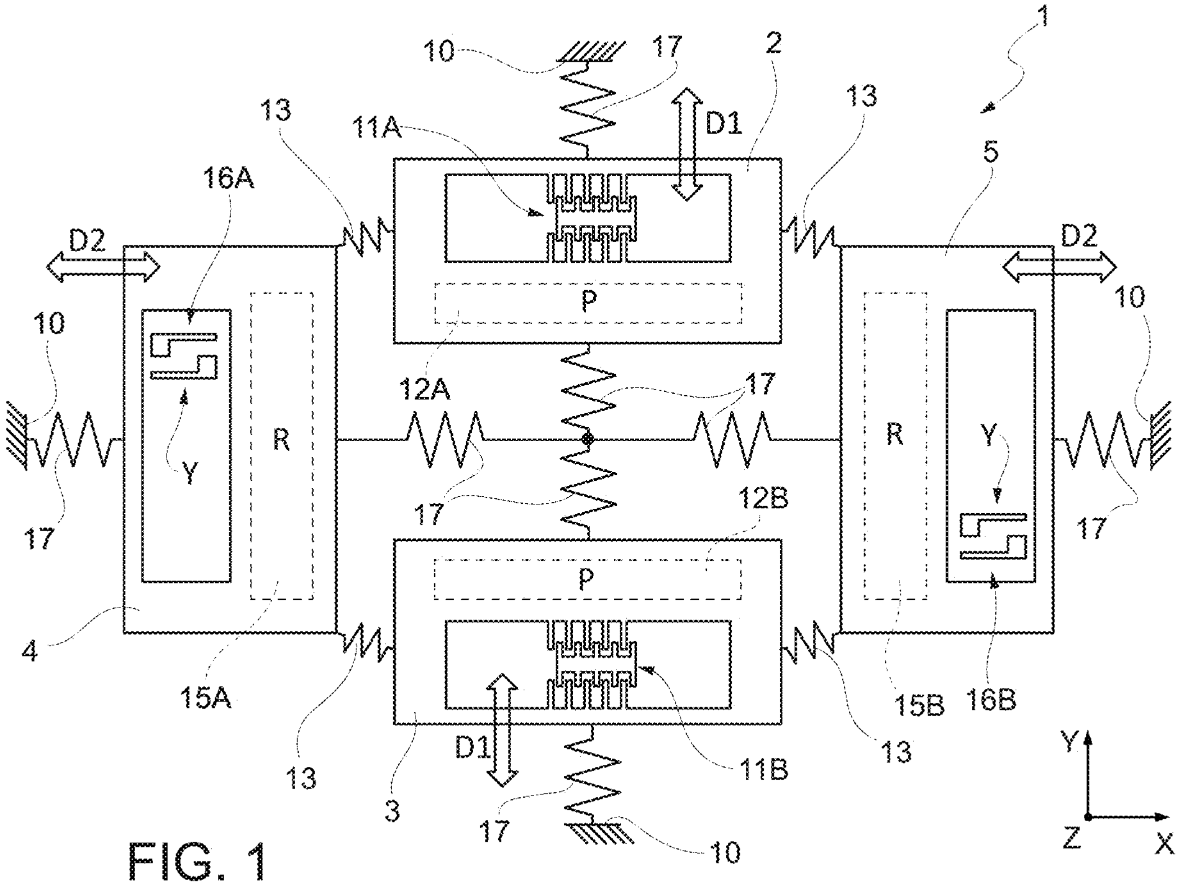
FIG. 1 is a schematic top view of a triaxial gyroscope.
Figure 2:
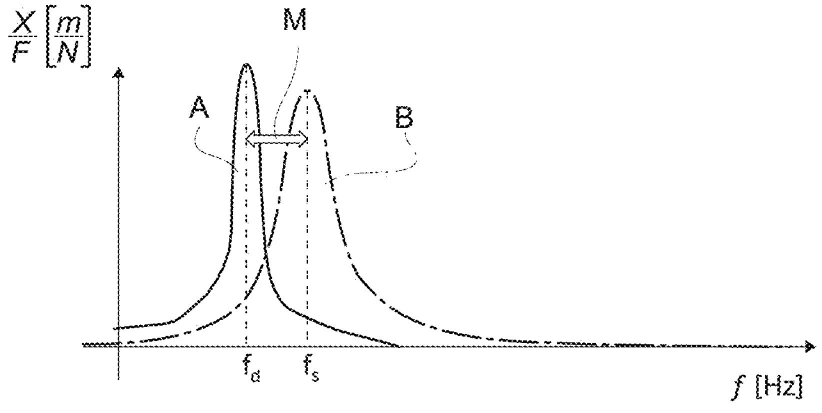
FIG. 2 shows the ideal transfer function of an oscillating movable mass of a gyroscope.
Figure 3:
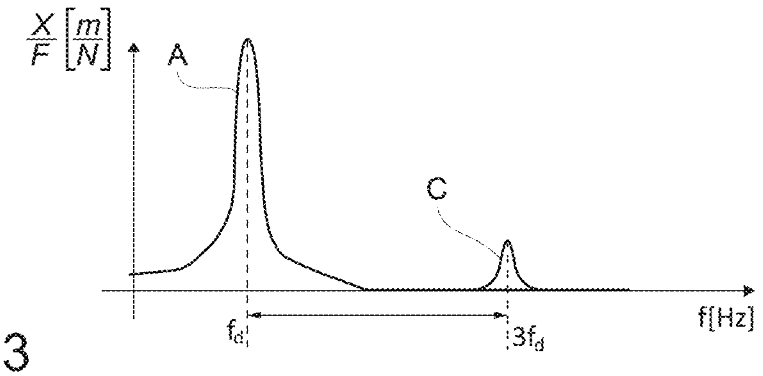
FIG. 3 shows the real transfer function, caused by a rectangular driving signal.
Figure 4:
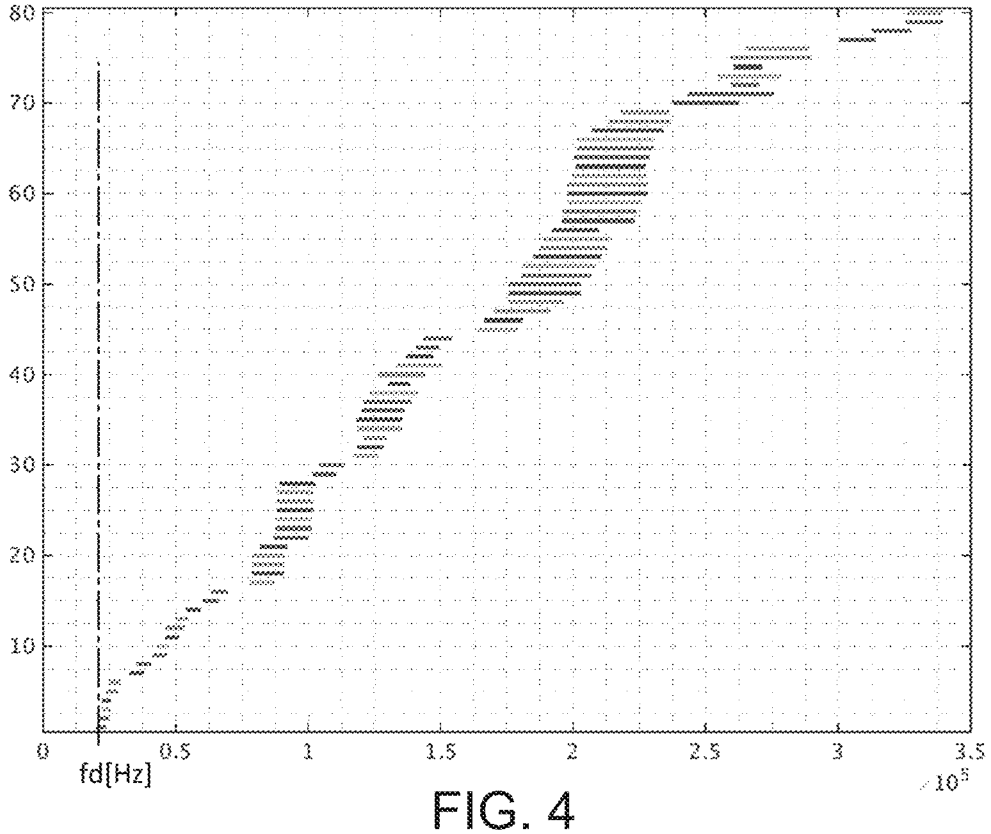
FIG. 4 shows a distribution of spurious modes in an oscillating movable mass of a gyroscope.
Figure 5:
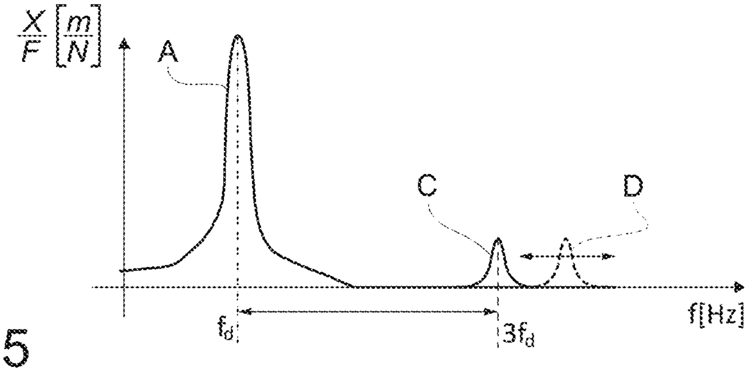
FIG. 5 shows a possible shift in the frequency domain of a spurious mode in an oscillating movable mass of a gyroscope, over time.
Figure 13:
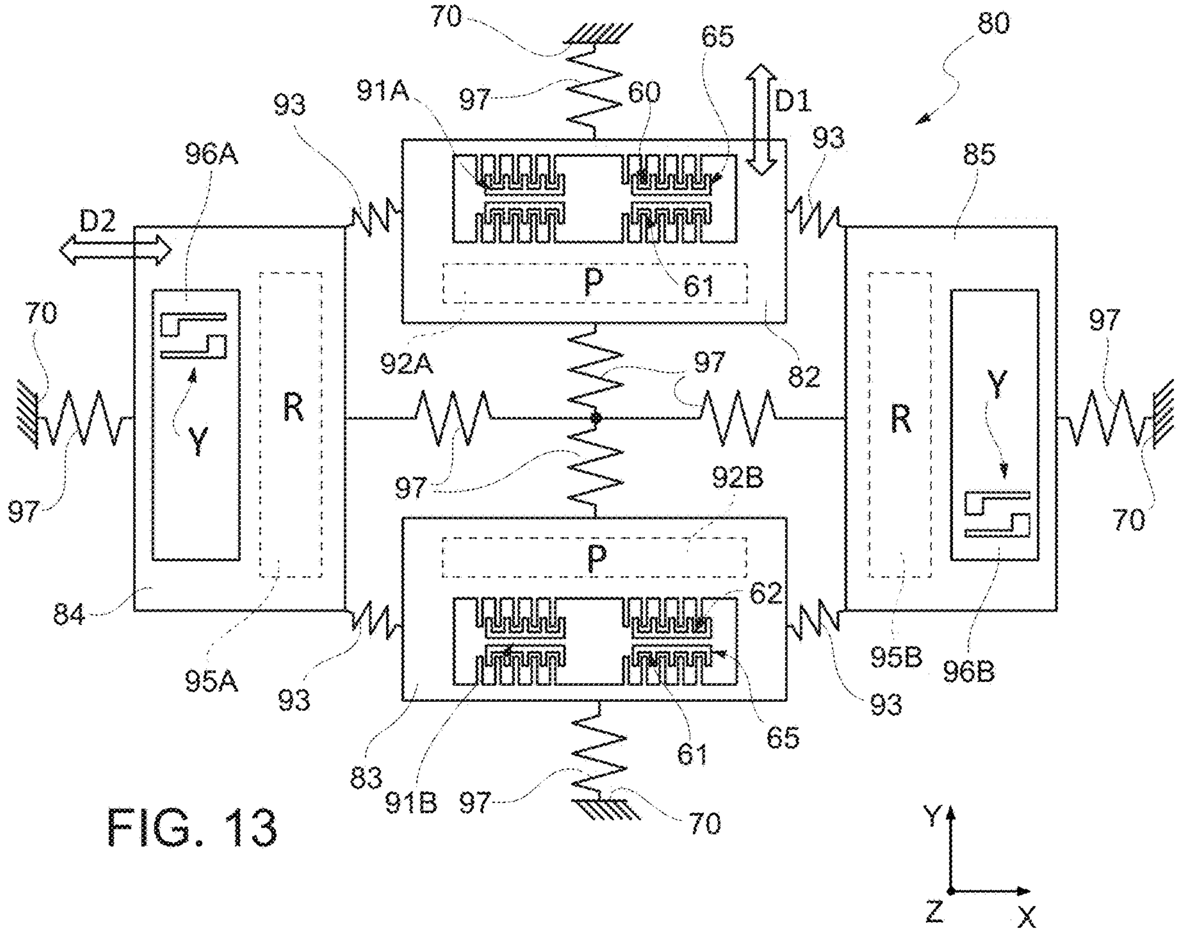
FIG. 13 is a schematic top view of a triaxial gyroscope comprising four movable masses having a test structure, according to an embodiment.

FIG. 13 shows a triaxial gyroscope 80 that has a general structure similar to the gyroscope of FIG. 1 and is implemented according to the principle described above for the gyroscope 50 of FIG. 6, with a single movable mass.

In particular, the triaxial gyroscope 80 has four movable masses 82-85 (first movable mass 82, second movable mass 83, third movable mass 84 and fourth movable mass 85), extending, in rest condition, in a lying plane parallel to the horizontal plane XY.

The triaxial gyroscope 80 also has a driving system comprising a first driving structure 91A and a second driving structure 91B.

The first driving structure 91A is formed by comb-like coupled movable electrodes and fixed electrodes, and is arranged between the first movable mass 82 and a substrate 70 (indicated schematically).

The second driving structure 91B is formed by comb-like coupled movable electrodes and fixed electrodes, and is arranged between the second movable mass 83 and the substrate 70.

Similarly to the gyroscope 1 of FIG. 1, the first and the second movable masses 82, 83 are supported on the substrate 70 so as to be able to oscillate along a first driving direction D1, parallel to the second horizontal axis Y (first driving movement), and to be able to oscillate parallel (or with a movement component parallel) to a vertical axis Z of the Cartesian reference system XYZ, in presence of a pitch movement P (rotation of the gyroscope 2 about the second horizontal axis Y).

First sensing electrodes 92A, 92B (shown dashed as not visible) are arranged on the substrate 70, below the first and the second movable masses 82, 83, and are coupled to the first movable mass 82 and, respectively, to the second movable mass 83, for sensing the pitch movement P along the vertical axis Z.

The third and the fourth movable masses 84, 85 are supported on the substrate 70 so as to be able to oscillate along a second driving direction D2, parallel to the first horizontal axis X (second driving movement), and to be able to oscillate parallel (or with a movement component parallel) to the vertical axis Z, in presence of a roll movement R (rotation of the gyroscope about the second horizontal axis Y).

Systems of elastic springs 93, shown in a schematic manner, allow transferring the first driving movement (directed along the first driving direction D1 and generated by the driving electrode groups 91A, 91B) from the first and the second movable masses 82, 83 to the third and the fourth movable masses 84, 85, turning it into the second driving movement, along the second driving direction D2.

Second sensing electrodes 95A, 95B (shown dashed as not visible) are arranged on the substrate 70, below the third and the fourth movable masses 84, 85 and are coupled to the third movable mass 84 and, respectively, to the fourth movable mass 85, for sensing the roll movement R along the vertical axis Z.

The third and the fourth movable masses 84, 85 are also supported on the substrate 70 so as to be able to oscillate along a third sensing direction, parallel to the second horizontal axis Y, in presence of a yaw movement Yaw (rotation of the gyroscope about the vertical axis Z). The third and the fourth movable masses 84, 85 are then coupled to the substrate 70 through third sensing electrodes 96A, 96B, for sensing the yaw movement Yaw.

The movable masses 82-84 are supported by a system of springs 97 which ideally allow all and only the movements described, along the driving and sensing directions.

In a known manner, the first, second and third sensing electrode groups 92A, 92B, 95A, 95B and 96A, 96B sense capacitive changes caused by the movement of the respective movable masses 82-85 (sensing signals).

In the triaxial gyroscope 80, the first and the second movable masses 82, 83 each also have a resonance frequency modification structure similar to the resonance frequency modification structure 65 of FIG. 6, therefore indicated by the same reference numerals, as well as the softening structure 61 and the hardening structure 62.

The triaxial gyroscope 80 is therefore subject to the softening and hardening effects like the uniaxial gyroscope 50 of FIG. 6 and therefore, when the softening 60 and hardening structures 61 are operated, it undergoes the same resonance frequency and therefore driving frequency shift described above.

The resonance frequency shift described above for the gyroscope 50, 80 may be used in a final-test step aimed at highlighting the devices which, while giving correct results at the factory, during the final electrical test, following spreads caused by the assembly, the working conditions, aging or other, risk the superimposition between the higher harmonics of the driving frequency and some spurious modes, causing the excitation of the latter and the worsening of the gyroscope performances.

In particular, according to a method described herein, during the test step, a softening ramp and a hardening ramp are applied (at different times) to the softening structure 60 and to the hardening structure 61 of the gyroscope 50, 80 and, during each application, the stability of the system is verified. If one of the two ramps causes an instability of the gyroscope 50, 80, this means that it risks incorrect operation during functioning, after mounting in an apparatus or system, in an unwanted manner.

In this case, the component may be discarded as defective or a modification in the driving frequency to less problematic values may be envisaged.

For example, FIG. 14 shows a flowchart of a final test method.

Initially, step 100, a standard calibration of the gyroscope is performed, with the aim of sensing specific characteristics of the component and setting the variable setting parameters, such as driving frequency, oscillator frequency, quadrature cancellation, sensitivity, etc.

To this end, in a known manner, and as shown in FIG. 15, the gyroscope 50, 80 is connected to a test machine 150 and is supplied through a power supply unit 152 for generating test voltages. For example, the power supply unit 152 may be contained in the test machine 150; alternatively, the test voltages may be applied through a control unit 154, for example an ASIC (Application Specific Integrated Circuit) activated by the test machine 150, or by a separate power supply unit, in a manner not shown, and using specific contact pads.

Then, a softening verification step is activated, step 102.

In this step, a softening voltage is applied to the softening structure 60, generated by the power supply unit 152 of FIG. 15. The softening voltage is a de voltage, variable between a minimum value Vmin_s (for example, 0 V) and a maximum value VMax_s, depending on the applied driving voltages (for example, 40 V). For example, the softening voltage is ramp-like increasing.

For example, in an embodiment having two softening/hardening structures 65, 61 for both the first and the second movable masses 82, 83 (and, similarly, two driving groups 91A, 91B and two sensing electrode groups), first hardening/softening electrodes of each pair (in each movable mass 83, 84) are driven with a dc voltage V1 and second hardening/softening electrodes of each pair (in each movable mass 83, 84) are driven with a dc voltage V2, indicated below:

$$V1 = VCM + \text{delta V}$$

$$V2 = VCM - \text{delta V}$$

where VCM is a common mode voltage (DC) and the voltage deltaV is the variable portion, for example linearly variable, to vary the hardening/softening effect.

The softening voltage is typically applied to the softening fixed electrodes 62 through the first fixed region 64, keeping the movable mass 51 (or all the movable masses 82-85) at a fixed voltage, e.g., at ground (0 V).

In this step 102, the driving modes are also activated.

During the application of the softening ramp, the test machine 150 of FIG. 14 acquires the output signal(s) of the gyroscope 50, 80 possibly generated due to the excitation of some spurious mode, performing a ZRL "Zero Rate Level" measurement, step 104.

If the ZRL measurement highlights an instability (increase in the offset value, for example by calculating the difference between an initial value and the progressively measured values and verifying whether this difference exceeds a threshold), output N from step 106, the gyroscope 50, 80 is considered out of specifications and rejected, step 108.

Conversely, output Y from step 106, the gyroscope is considered stable with respect to softening phenomena and hardening verification is carried out.

In particular, step 110, a hardening voltage is applied to the hardening structure 61, that is dc voltage and variable between a minimum value Vmin_h (for example, 0 V) and a maximum value VMax_h, depending on the driving voltages applied (for example, 40 V). For example, the dc hardening voltage is ramp-like increasing.

The hardening voltage is typically applied to the hardening fixed electrodes 66 through the second fixed region 68, keeping the movable mass 51 (or all the movable masses 82-85) at a fixed voltage, for example at ground (0 V).

During the application of the hardening ramp, the test machine 150 of FIG. 14 acquires the output signal(s) of the gyroscope 50, 80 to sense any movements of the same movable mass due to spurious modes (ZRL "Zero Rate Level" measurement), step 112.

If the ZRL value highlights an instability (for example by calculating the difference between an initial value and the progressively measured values and verifying whether this difference exceeds a threshold, output N from step 114, the gyroscope 50, 80 is considered out of specifications and discarded, step 116.

Conversely, output Y from step 106, the gyroscope is considered stable and may be subject to subsequent processing, storage and transport steps (step 118).

As an alternative to what shown, in case of variable output signals exceeding a threshold (steps 108, 116) the gyroscope may be subject to further calibration to modify the driving frequency.

Obviously, the softening and hardening test steps may be performed in the opposite sequence.

The gyroscope described here and the test method thereof therefore allow to identify components which, while resulting fully functional during the usual final tests (for example during the EWS, or on a MEMS wafer, or at an assembled level, in a same package with the control unit—ASIC or even after the assembly on a support—board—, possibly by a purchaser), have a marginality that may lead them to operate to cause activation of spurious modes, once they are assembled and mounted.

In this manner, any criticalities may be highlighted at an early stage and subsequent mounting/assembly operations as well as rejections and returns by customers, with the related costs, may be avoided.

The gyroscope may be manufactured at costs comparable to those of similar gyroscopes and the introduction of the softening and hardening structures does not require large space; therefore the present gyroscope has dimensions comparable to those of similar components without spurious mode test structures.

The presence of the softening and hardening structures does not entail a limitation in the work excursion of the movable mass or masses, and therefore does not influence sensitivity of the same gyroscope.

Finally, it is clear that modifications and variations may be made to the MEMS gyroscope and to the test method described and illustrated herein without thereby departing from the scope of the present disclosure, as defined in the attached claims.

For example, the shape of the test fixed and movable electrodes might be interchanged.

A vibrational MEMS structure (50; 80) may be summarized as including: a substrate (52; 70); a movable mass (51; 82-85) suspended on the substrate and having a resonance frequency; a resonance modification test structure (65), comprising modification fixed electrodes (62, 66), integral with the substrate (52; 70), and modification movable electrodes (63, 67), integral with the movable mass, each modification fixed electrode (62, 66) extending in a length direction and facing at least one respective modification movable electrode (63, 67), the modification fixed electrodes (62, 66) and the modification movable electrodes (63, 67) being configured so that each modification fixed electrode is placed, at rest, at a distance, from the respective at least one modification movable electrode, which is variable along the length direction and defines an average gap, wherein the resonance modification test structure (65) is configured to be biased, in a resonance modification test step, to a direct and variable modification voltage such as to cause a modification of the average gap between each modification fixed electrode (62, 66) and a respective modification movable electrode (63, 67), by modifying the resonance frequency of the movable mass (51; 82-85) and the driving frequency.

The vibrational MEMS structure may further include: an elastic system (53; 93, 97), elastically coupling the movable mass to the substrate so as to allow driving movements of the movable mass (51; 82-85), in a driving direction, and sensing movements, in a sensing direction; a driving structure (56; 91A, 91B), coupled to the movable mass (51; 82-85) and configured to generate, in use, the driving movements of the movable mass at a driving frequency; and a sensing structure (59; 92A, 92B, 95A, 95B, 96A, 96B), coupled to the movable mass and configured to sense the sensing movements of the movable mass.

The vibrational MEMS structure may form a gyroscope.

The resonance modification test structure (65) may include a softening test structure (60) and the modification fixed electrodes are softening fixed electrodes (62) and the modification movable electrodes are softening movable electrodes (63), the softening test structure being configured to cause a reduction in the resonance frequency of the movable mass and the driving frequency.

The softening movable electrodes (63) may extend from the movable mass (51; 82-85) and the softening fixed electrodes (62) may have a decreasing width towards the movable mass, along in the length direction.

The resonance modification test structure (65) may include a hardening test structure (61), the modification fixed electrodes may be hardening fixed electrodes (66) and the modification movable electrodes may be hardening movable electrodes (67), the hardening test structure being configured to cause an increase in the resonance frequency of the movable mass and the driving frequency.

The hardening movable electrodes (67) may extend from the movable mass (51; 82-85) and the hardening fixed electrodes (66) may have an increasing width towards the movable mass, along the length direction.

The resonance modification test structure (65) may further include a softening test structure (60) including softening fixed electrodes (62) and softening movable electrodes (63), the softening fixed electrodes (62) and the softening movable electrodes (63) being configured so that each softening fixed electrode is placed, at rest, at a distance, from the respective at least one modification movable electrode, which is variable along the length direction, the softening test structure (60) being configured to cause a reduction in the resonance frequency of the movable mass (51; 82-85) and the driving frequency.

The modification fixed electrodes (62, 66) may have a paraboloid shape.

A test system of a vibrational MEMS structure may be summarized as including biasing means (152) configured to generate the modification direct voltage, and a ZRL measurement unit (150), configured to verify a stability condition of the movable mass (51; 82-85) in presence of the modification voltage.

The modification direct voltage may be a ramp increasing from a minimum value to a maximum value.

A test method of a vibrational MEMS structure (50; 80) may be summarized as including a substrate (52; 70); a movable mass (51; 82-85) suspended on the substrate and having a resonance frequency; an elastic system (53; 93, 97), elastically coupling the movable mass to the substrate thereby allowing the movable mass driving movements, in a driving direction, and sensing movements, in a sensing direction; a driving structure (56; 91A, 91B), coupled to the movable mass and configured to generate, in use, the driving movements of the movable mass; a sensing structure (59; 92A, 92B, 95A, 95B, 96A, 96B), coupled to the movable mass and configured to sense the sensing movements of the movable mass; a resonance modification test structure (65), comprising modification fixed electrodes (62, 66), integral with the substrate, and modification movable electrodes (63, 67), integral with the movable mass, each modification fixed electrode extending in a length direction and facing at least one respective modification movable electrode, the modification fixed electrodes and the modification movable electrodes being configured so that each modification fixed electrode is placed, at rest, at a distance, from the respective at least one modification movable electrode, which is variable along the length direction and defines an average gap, the method comprising: applying, to the resonance modification test structure (65), a direct, variable modification voltage; modifying the resonance frequency of the movable mass (51; 82-85) and the driving frequency; operating the driving structure (56; 91A, 91B); and verifying whether the movable mass (51; 82-85) is stable.

Modifying the resonance frequency may include applying a potential difference between softening fixed electrodes (62) and softening movable electrodes (63).

Modifying the resonance frequency may include applying a potential difference between hardening fixed electrodes (66) and hardening movable electrodes (67).

The modification voltage may be variable between a minimum value and a maximum value.

If verifying whether the movable mass (51; 82-85) is stable determines the movable mass as unstable, the vibrational MEMS structure may be discarded.

Verifying whether the movable mass (51; 82-85) is stable may include performing a plurality of ZRL measurements and verifying that differences between the ZRL measurements are lower than a threshold.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vibrational MEMS structure, comprising:

a substrate;

a movable mass suspended on the substrate and having a resonance frequency;

an elastic system, elastically coupling the movable mass to the substrate so as to allow driving movements of the movable mass, in a driving direction, and sensing movements, in a sensing direction;

a driving structure, coupled to the movable mass and configured to generate, in use, the driving movements of the movable mass at the driving frequency;

a sensing structure, coupled to the movable mass and configured to sense the sensing movements of the movable mass; and a resonance modification test structure including modification fixed electrodes, integral with the substrate, and modification movable electrodes, integral with the movable mass, each modification fixed electrode extending in a length direction and facing at least one respective modification movable electrode, the modification fixed electrodes and the modification movable electrodes being configured so that each modification fixed electrode is placed, at rest, at a distance, from the respective at least one modification movable electrode, which is variable along the length direction and defines an average gap, and wherein:

the resonance modification test structure is configured to be biased, in a resonance modification test step, to a direct and variable modification voltage such as to cause a modification of the average gap between each modification fixed electrode and a respective modification movable electrode, by modifying the resonance frequency of the movable mass and a driving frequency.

2. The vibrational MEMS structure according to claim 1, wherein the resonance modification test structure comprises a softening test structure and the modification fixed electrodes are softening fixed electrodes and the modification movable electrodes are softening movable electrodes, the softening test structure being configured to cause a reduction in the resonance frequency of the movable mass and the driving frequency.

3. The vibrational MEMS structure according to claim 2, wherein the softening movable electrodes extend from the movable mass and the softening fixed electrodes have a decreasing width towards the movable mass, along the length direction.

4. The vibrational MEMS structure according to claim 1, wherein the resonance modification test structure comprises a hardening test structure, the modification fixed electrodes are hardening fixed electrodes and the modification movable electrodes are hardening movable electrodes, the hardening test structure being configured to cause an increase in the resonance frequency of the movable mass and the driving frequency.

5. The vibrational MEMS structure according to claim 4, wherein the hardening movable electrodes extend from the movable mass and the hardening fixed electrodes have an increasing width towards the movable mass, along the length direction.

6. The vibrational MEMS structure according to claim 4, wherein the resonance modification test structure further comprises a softening test structure including softening fixed electrodes and softening movable electrodes, the softening fixed electrodes and the softening movable electrodes being configured so that each softening fixed electrode is placed, at rest, at a distance, from the respective at least one modification movable electrode, which is variable along the length direction, the softening test structure being configured to cause a reduction in the resonance frequency of the movable mass and the driving frequency.

7. The vibrational MEMS structure according to claim 1, wherein the modification fixed electrodes have a paraboloid shape.

8. The vibrational MEMS structure of claim 1, wherein the modification voltage is variable between a minimum value and a maximum value.

9. A test method, comprising:

testing a vibrational MEMS structure, the vibrational MEMS structure including:

a substrate; a movable mass suspended on the substrate and having a resonance frequency;

an elastic system, elastically coupling the movable mass to the substrate thereby allowing the movable mass driving movements, in a driving direction, and sensing movements, in a sensing direction;

a driving structure, coupled to the movable mass and configured to generate, in use, the driving movements of the movable mass;

a sensing structure, coupled to the movable mass and configured to sense the sensing movements of the movable mass;

a resonance modification test structure, comprising modification fixed electrodes, integral with the substrate, and modification movable electrodes, integral with the movable mass, each modification fixed electrode extending in a length direction and facing at least one respective modification movable electrode, the modification fixed electrodes and the modification movable electrodes being configured so that each modification fixed electrode is placed, at rest, at a distance, from the respective at least one modification movable electrode, which is variable along the length direction and defines an average gap, the method comprising:

applying, to the resonance modification test structure, a direct, variable modification voltage;

the testing the vibrational MEMS structure including:

modifying the resonance frequency of the movable mass and the driving frequency;

operating the driving structure; and verifying whether the movable mass is stable.

10. The test method according to claim 9, wherein modifying the resonance frequency comprises applying a potential difference between softening fixed electrodes of the modification fixed electrodes and softening movable electrodes of the modification movable electrodes.

11. The test method according to claim 10, wherein modifying the resonance frequency comprises applying a potential difference between hardening fixed electrodes of the modification fixed electrodes and hardening movable electrodes of the modification movable electrodes.

12. The test method according to claim 11, wherein the modification voltage is variable between a minimum value and a maximum value.

13. The test method according to claim 9, wherein, if verifying whether the movable mass is stable determines the movable mass is unstable, the vibrational MEMS structure is discarded.

14. The test method according to claim 9, wherein verifying whether the movable mass is stable comprises performing a plurality of ZRL measurements and verifying that differences between the ZRL measurements are lower than a threshold.

15. The vibrational MEMS structure of claim 9, wherein the modification fixed electrodes have a paraboloid shape.

16. A vibrational MEMS structure, comprising:

a substrate;

a movable mass suspended from the substrate, the movable mass including an opening that extends into the movable mass, and the opening being delimited by a first side of the movable mass that delimits the opening and a second side of the movable mass that delimits the opening, the first side being opposite to the second side, and the first side facing the second side;

a driving structure within the opening of the movable mass, the driving structure including:

driving fixed electrodes that are coupled to the substrate and are within the opening; and driving movable electrodes that are coupled to the movable mass and extend into the opening, the driving movable electrodes include a first group that extend into the opening at the first side and a second group extend into the opening at the second side;

a frequency modification structure including:

a softening structure including:

softening fixed electrodes that are coupled to the substrate; and softening movable electrodes that are coupled to the movable mass and extend into the opening, the softening movable electrodes extend into the opening from the first side;

a hardening structure including:

hardening fixed electrodes that are coupled to the substrate; and hardening movable electrodes that are coupled to the movable mass and extend into the opening, the hardening movable electrodes extend into the opening from the second side.

17. The vibrational MEMS structure of claim 16, wherein:

each respective softening electrode of the softening fixed electrodes includes an end spaced apart from the first side and a curve that extends from the first side to the free end, and each respective softening fixed electrode of the softening fixed electrodes is wider at the first side than at the end; and each respective hardening movable electrode of the hardening movable electrodes includes a end spaced apart from the second side and a curve that extends from the end and terminates along the respective hardening movable electrode before reaching the second side, and each respective hardening electrode of the hardening fixed electrodes is wider at the end than at the second side.

18. The vibrational MEMS structure of claim 17, wherein:

the softening structure is configured to, in operation, perform a softening verification step to determine stability; and the hardening structure is configured to, in operation, perform a hardening verification step to determine stability.

19. The vibrational MEMS structure of claim 16, wherein the hardening movable electrodes extend from the movable mass and the hardening fixed electrodes have an increasing width towards the movable mass, along the length direction.

20. The vibrational MEMS structure of claim 19, softening movable electrodes extend from the movable mass and the softening fixed electrodes have a decreasing width towards the movable mass, along the length direction.

* * * * *